United States Patent
Ashmore

(10) Patent No.: US 7,549,545 B1
(45) Date of Patent: Jun. 23, 2009

(54) ATV HOIST AND METHOD FOR LOADING AND SKINNING AN ANIMAL

(76) Inventor: Eddy Ashmore, 648 Hwy. 42, Sumrall, MS (US) 39482

( * ) Notice: Subject to any disclaimer, the term of this patent is extended or adjusted under 35 U.S.C. 154(b) by 0 days.

(21) Appl. No.: 12/221,342

(22) Filed: Aug. 1, 2008

Related U.S. Application Data

(60) Provisional application No. 60/964,808, filed on Aug. 16, 2007.

(51) Int. Cl.
  *B66C 23/44* (2006.01)
(52) U.S. Cl. ........................ 212/180; 414/462
(58) Field of Classification Search ........................ None
  See application file for complete search history.

(56) References Cited

U.S. PATENT DOCUMENTS

| | | | |
|---|---|---|---|
| 831,015 A * | 9/1906 | Marvin | 212/180 |
| 5,662,451 A * | 9/1997 | Muzzi et al. | 414/540 |
| 6,994,618 B1 * | 2/2006 | Syers | 452/187 |
| 7,300,238 B1 * | 11/2007 | James | 414/540 |
| 2007/0248443 A1 * | 10/2007 | Stucks | 414/462 |

* cited by examiner

Primary Examiner—Thomas J. Brahan

(57) ABSTRACT

A multi-animal hoisting system preferably includes a first hoisting section adapted to be coupled to a rear section of the existing all-terrain vehicle for loading and unloading a first animal from the all-terrain vehicle respectively. The system may further include a second hoisting section adapted to be coupled to a front section of the existing all-terrain vehicle for suspending a second animal at a desired height above a ground surface. The first and second hoisting sections may be independently and simultaneously operable such that the first and second animals are contemporaneously maintained at substantially stable positions respectively.

12 Claims, 3 Drawing Sheets

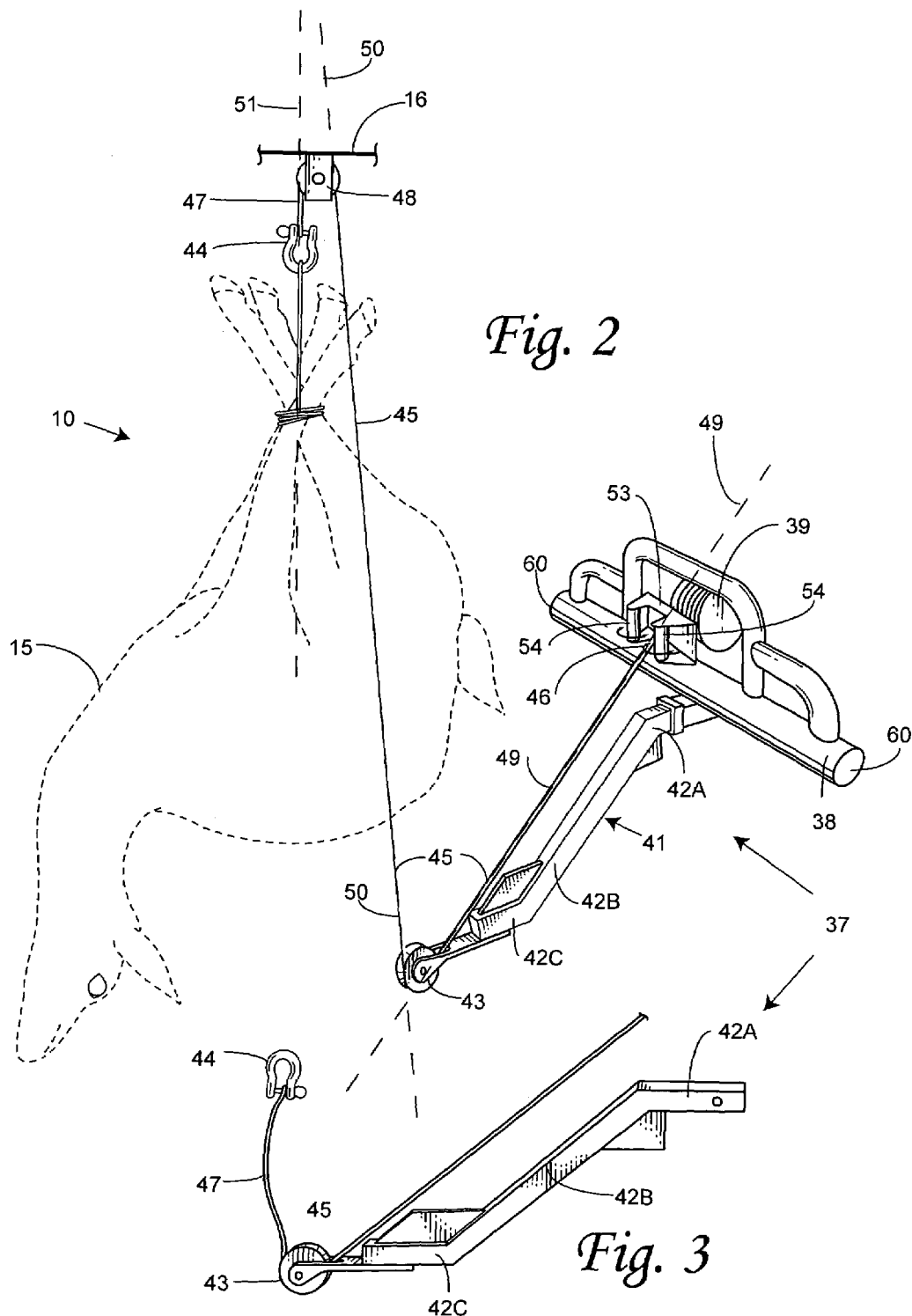

ATV HOIST AND METHOD FOR LOADING AND SKINNING AN ANIMAL

CROSS REFERENCE TO RELATED APPLICATIONS

This application claims the benefit of U.S. Provisional Application No. 60/964,808, filed Aug. 16, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to animal loading and skinning systems and, more particularly, to a multi-animal hoisting system for use with an existing all-terrain vehicle such that a user is able to easily load and unload a first animal from the existing all-terrain vehicle while skinning a second animal supported by the existing all-terrain vehicle.

2. Prior Art

When a large animal, such as a deer, is shot and killed by a hunter in the wild, the hunter is then left with the job of skinning and carrying home the animal. It is desirable to skin the animal in a way that does not damage the head and antlers of the animal because a hunter often desires to mount this portion of the animal. Also, it is desirable for the hunter to place the body of the animal in a bag after the skin of the animal has been removed so that dirt and other contaminants associated with the animal's fur are effectively separated away from the portion of the animal which is useful as meat.

It is well known in the prior art that through the judicious placing of incisions through the skin of the large game animal, the skin of the animal can be relatively easily removed by merely peeling the skin of the animal off of the carcass. Various patents have been awarded for devices which more easily facilitate this skinning process. However, all of these devices are designed for use in a substantially similar way. That is, first the animal is suspended from a tree limb so that the animal is elevated above the ground. Then a cable is attached to the skin of the animal behind the neck. Upon applying tension to the cable, as with a vehicle, the skin is peeled away from the animal. At the outset of the peeling process the animal is hanging substantially vertically and the point of cable connection is high on the animal with an opposite end of the cable a considerable distance away attached to a vehicle. Thus, the peeling force is substantially perpendicular to a dorsal surface of the animal. As peeling occurs, the point of cable connection moves down the animal and thereby causes the animal to pivot toward the vehicle. When the peeling is nearly complete, the peeling force is substantially parallel to the ground.

The animal may also be suspended from a tree so that once the skin is removed, the animal will not be contaminated by dirt or other debris lying on the ground. While this provides a clean and relatively simple method for skinning a large game animal, it is not always possible to string the large game animal up into a tree. In some outdoor environments, no trees are readily available having the characteristics desired for elevating the large game animal above the ground. In other circumstances, the animal which has been killed is so large that the hunter is unable to suspend the animal in a tree. In these circumstances the prior art devices are not capable of effectively performing the skinning function desired.

U.S. Pat. No. 5,782,684 to Shaff discloses a self-contained, independently operating, adjustable, portable animal skinning device for use with hunting game. The animal skinner incorporates parallel upper and lower racks, each having a plurality of hollow, telescoping metal rods that facilitate the length adjustment thereof. Two oppositely disposed end supports sandwich the telescoping metal rods therebetween. A cable extends at least the combined length of the upper rack, the lower racks, and the vertical distance, therebetween. One end of the cable engages a clamp assembly, which removably secures an animal hide to the cable. The cable extends along the upper rack, engaging a roller on one of the horizontally-oriented hollow metal rods, and extends downward and along the lower rack. The other end of the cable operably engages a winch that in turn operably engages a portable AC power source, such as a 12 volt marine battery. A chain detachably engages the upper horizontal rod on the end support with the winch. An animal to be skinned is chained to the upper rack at a point below its head, to secure it thereto, and the clamp assembly is secured to the animal hide, whereupon the winch is actuated, urging the cable towards it and spooling it thereon to ultimately facilitate skinning as the cable is displaced away from the head of the animal. Once the hide is completely removed, it travels with the cable to be safely deposited onto the lower rack. Unfortunately, this prior art example is not designed for use with an existing all-terrain vehicle.

U.S. Pat. No. 5,626,514 to Rothove discloses a small game skinning device that includes an elongated frame tubing that has a first end and a second end, and a short frame tubing that is L-shaped. The short frame tubing has an upper end and a back end that is positioned over the first end of the elongated frame tubing. A ratcheting mechanism and spool are both supported above the second end of the elongated frame tubing by a pair of support arms and an axial rod. The spool has a drum that has a heavy-duty cord wound there around. A first claw is positioned through an upper end of the short frame tubing by a threaded rod fixedly attached thereto. A second claw has an eyelet that receives one end of the cord. The cord has another end that is wrapped around the spool. The first claw is hooked onto a part of a small animal, while the second claw grapples with the animal's back skin. The back skin is pulled away from the animal by pulling the second claw toward the second end of the elongated framing tube with the ratcheting mechanism. Unfortunately, this prior art example is not designed for use with an existing all-terrain vehicle.

U.S. Pat. No. 5,336,124 to Garside discloses a method and apparatus for skinning while protecting the hide and carcass of game animals while the game animal is held in a horizontal position at ground level. The apparatus includes a head harness for connection of the head of the game animal to a stationary object. A skin remover is attachable to the skin of the animal just below a neck incision and is also attachable to a vehicle bumper. A wrap-around game bag is located beneath the game during the skinning process, which ensures that dirt and debris are kept away from the game during the skinning process. The method of skinning includes attaching the head of the game to a stationary object, attaching the skin remover to a vehicle and then applying force with the vehicle to the skin of the animal while the animal remains attached to the stationary object. Just before the skinning occurs and when tension is maximized, the bag is located in its open orientation beneath the game animal. Once the skin is removed the head harness is removed from the head of the animal and the wrap-around game bag is closed around the thus skinned game animal. Unfortunately, this prior art example does not provide users with a means to effectively transport at least two animals.

Accordingly, the present invention is disclosed in order to overcome the above noted shortcomings. The present invention satisfies such a need by providing a device that is convenient and easy to use, lightweight yet durable in design, and designed for assisting a user to skin a deer and load the carcass onto a vehicle without the use of a tree. The device includes a means for hoisting a heavy carcass for the purpose of skinning and loading it onto a vehicle. The present invention is simple to use, inexpensive, and designed for many years of repeated use.

BRIEF SUMMARY OF THE INVENTION

In view of the foregoing background, it is therefore an object of the present invention to provide an apparatus for use with an existing all-terrain vehicle such that a user is able to easily load and unload a first animal from the existing all-terrain vehicle while skinning a second animal supported by the existing all-terrain vehicle. These and other objects, features, and advantages of the invention are provided by a multi-animal hoisting system.

A multi-animal hoisting system preferably includes a first hoisting section adapted to be effectively coupled to a rear section of the existing all-terrain vehicle for loading and unloading a first animal from the all-terrain vehicle respectively. Such a first hoisting section may include a first sleeve oriented along a vertical axis and preferably statically maintained at a fixed spatial distance from a second hoisting section, as mentioned hereinafter. A first rectilinear shaft may be rotatably seated within such a first sleeve and preferably extends upwardly therefrom along the vertical axis.

A second sleeve may be statically coupled to a top end of the first shaft. Such a second sleeve is preferably angularly offset from the vertical axis such that axially opposed ends of the second sleeve are disposed below and above the top end of the first shaft respectively. A second rectilinear shaft may be removably interfitted within the second sleeve and preferably extends parallel thereto, and a third rectilinear shaft may be directly mated to the second shaft and angularly offset therefrom such that the third shaft is aligned with a horizontal axis registered orthogonal to the vertical axis.

The first hoisting section may further include a manually operated winch anchored to the first shaft, first and second pulleys conveniently anchored to the first and third shafts respectively, a substantially U-shaped first fastener, and a flexible first cable that has a first end anchored to the winch and further has a second end conjoined directly to the first fastener. Such a first cable preferably travels along mutually exclusive first and second linear paths registered parallel to the first and second shafts respectively, and further may travel along a third linear path extending downwardly from the second pulley and terminating at the fastener respectively. The first cable and the first, second and third shafts are contemporaneously and preferably rotated about the vertical axis such that the first animal is swiveled towards the existing all-terrain vehicle.

The system may further include a second hoisting section advantageously adapted to be coupled to a front section of the existing all-terrain vehicle for suspending a second animal at a desired height above a ground surface. Such a second hoisting section preferably includes a protective support bar, and a power operated winch situated posterior of the support bar and coupled thereto. Such a power operated winch may further be electrically coupled to an existing power source of the existing all-terrain vehicle. A single and unitary beam preferably has a curvilinear shape situated subjacent to the power operated winch and may extend distally away therefrom. Such a beam preferably has first, second and third monolithically formed linear segments offset from each other and traveling along mutually exclusive planes respectively, and a first pulley may be conjoined to the third linear segment and may extend horizontally away therefrom.

The second hoisting section may further include a substantially U-shaped second fastener, and a flexible second cable that has a first end effectively anchored to the power operated winch and further has a second end directly affixed to the second fastener respectively. The second hoisting section may further include a second pulley attached to an existing support surface spaced from the existing all-terrain vehicle and disposed above the first pulley. The second cable preferably travels along a first linear path extending downwardly and distally away from the power operated winch. Such a first linear path may terminate at the first pulley, and the second cable may further travel along a second linear path that extends upwardly and distally away from the first pulley. Such a second linear path preferably terminates at the second pulley, and the second cable may further travel along a third linear path extending vertically downward from the second pulley and terminating at the second fastener.

The support bar of the second hoisting section preferably includes a bracket medially situated between laterally opposed ends thereof such that the bracket is conveniently aligned anterior to the power operated winch. A plurality of cylindrical guide rollers may be pivotally anchored to the bracket and oriented adjacent to the first linear travel path. Such rollers are oppositely spaced left and right sides of the second cable for prohibiting the second cable from undesirably oscillating away from the first linear path when the second animal sways side-to-side. The first and second hoisting sections may be independently and simultaneously operable such that the first and second animals are contemporaneously maintained at substantially stable positions respectively.

A preferable method for easily loading and unloading a first animal from an existing all-terrain vehicle while skinning a second animal supported by the existing all-terrain vehicle may include the steps of: providing and coupling a first hoisting section to a rear section of the existing all-terrain vehicle; providing and coupling a second hoisting section to a front section of the existing all-terrain vehicle; independently and simultaneously loading and unloading a first animal from the all-terrain vehicle while suspending a second animal at a desired height above a ground surface by independently and simultaneously operating the first and second hoisting sections; and contemporaneously maintaining the first and second animals at substantially stable positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a perspective view showing a second hoisting section of the multi-animal hoisting system with an attached power operated winch;

FIG. 3 is a side elevational view of the second hoisting section shown in FIG. 2.

DETAILED DESCRIPTION OF THE INVENTION

Figure 1:
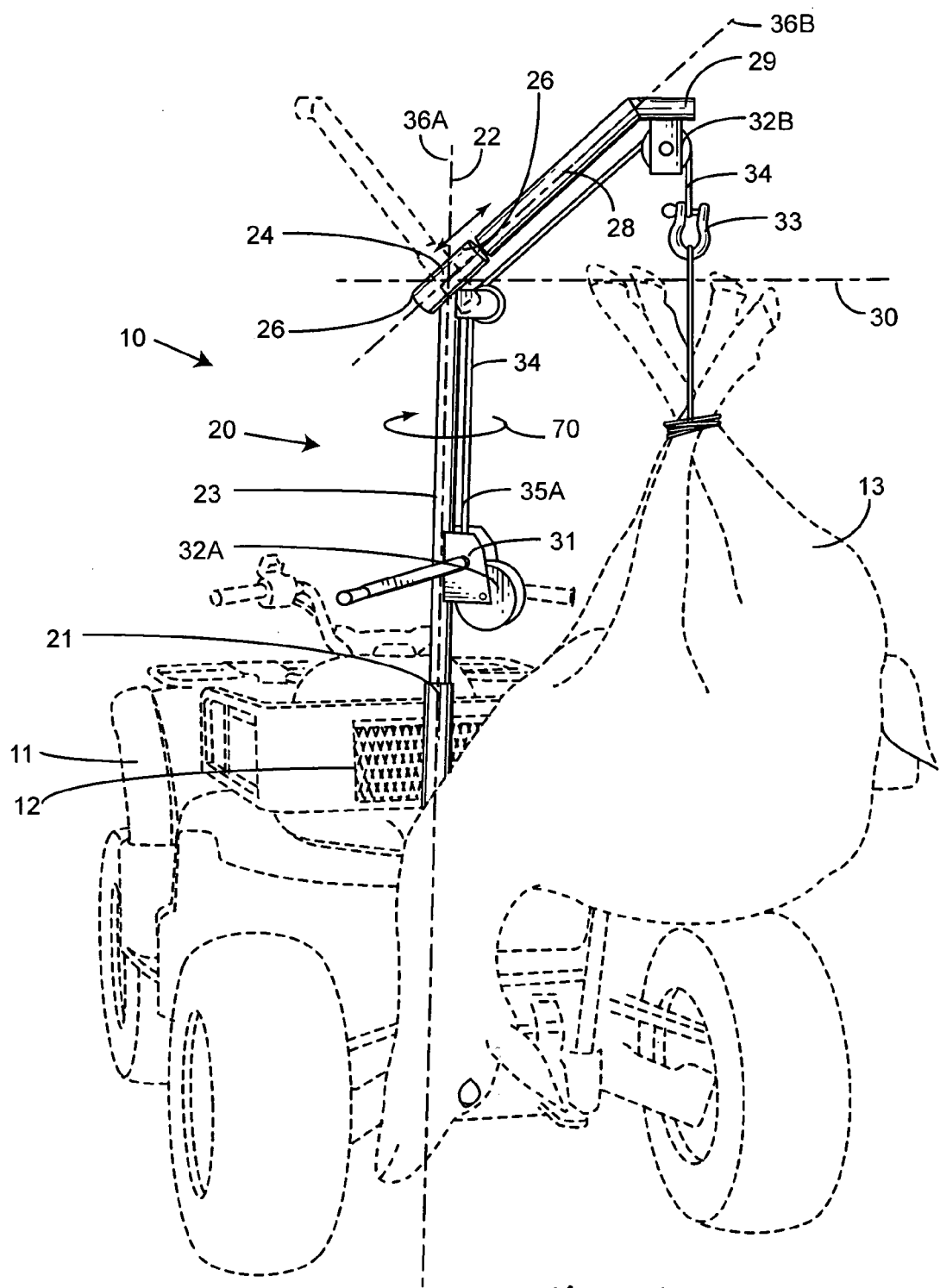
FIG. 1 is a perspective view showing a first hoisting section of a multi-animal hoisting system, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-4 by the reference numeral 10 and is intended to provide a multi-animal hoisting system. It should be understood that the system 10 may be used for hoisting many different types of game and animals and should not be limited to hoisting only those types of game and animals mentioned herein.

Referring initially to FIG. 1, a multi-animal hoisting system 10 preferably includes a first hoisting section 20 adapted to be coupled to a rear section 12 of the existing all-terrain vehicle 11 for loading and unloading a first animal 13 from the all-terrain vehicle 11 respectively. Such a first hoisting section 20 may include a first sleeve 21 oriented along a vertical axis 22 and preferably statically maintained at a fixed spatial distance from a second hoisting section 37, as mentioned hereinafter. A first rectilinear shaft 23 may be rotatably seated within such a first sleeve 21 and preferably extends upwardly therefrom along the vertical axis 22.

A second sleeve 24 may be statically coupled to a top end 25 of the first shaft 23. Such a second sleeve 24 is preferably angularly offset from the vertical axis 22 which is essential such that axially opposed ends 26 of the second sleeve 24 are disposed below and above the top end 25 of the first shaft 23 respectively. Such a second rectilinear shaft 28 may be removably interfitted within the second sleeve 24 and preferably extends parallel thereto. A third rectilinear shaft 29 may be directly mated, without the use of intervening elements, to the second shaft 28 and angularly offset therefrom which is essential such that the third shaft 29 is aligned with a horizontal axis 30 registered orthogonal to the vertical axis 22.

Referring to FIG. 1, the first hoisting section 20 may further include a manually operated winch 31 anchored to the first shaft 23. First and second pulleys 32A, 32B are anchored to the first and third shafts 23, 29 respectively. Such pulleys are offset at varying heights from the ground surface, as shown in FIG. 1. A substantially U-shaped first fastener 33 is also provided. A flexible first cable 34 has a first end 35A anchored to the winch 31 and further has a second end 35B conjoined directly, without the use of intervening elements, to the first fastener 33. Such a first cable 34 preferably travels along mutually exclusive first and second linear paths 36A, 36B registered parallel to the first and second shafts 23, 28 respectively, and further may travel along a third linear path 36C extending downwardly from the second pulley 32B and terminating at the fastener 33 respectively.

The first cable 34 and the first, second and third shafts 23, 28, 29 are contemporaneously and preferably rotated about the vertical axis 22 along a circular path which 70 is vital such that the first animal 13 is swiveled towards the existing all-terrain vehicle 11, while maintaining the animal's center of mass proximately situated adjacent to vehicle 11. The combination of such claimed elements provides an unpredictable and unexpected result which is not rendered obvious by one skilled in the art, wherein a user may use the winch 31 to conveniently hoist and transport heavy animals thus saving time and energy.

Figure 4:
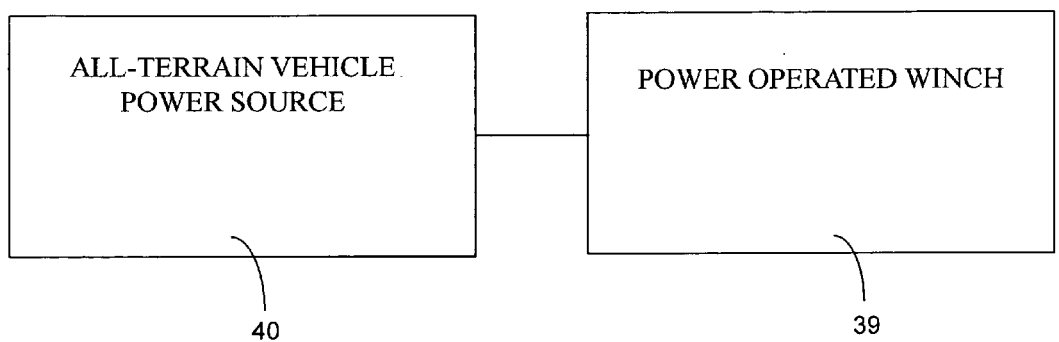
FIG. 4 is a schematic block diagram of a power source and a power operated winch of the second hoisting system, in accordance with the present invention.

Referring to FIGS. 2, 3 and 4, the system 10 may further include a second hoisting section 37 adapted to be coupled to a front section of the existing all-terrain vehicle 11 for suspending a second animal 15 at a desired height above a ground surface. Such a second hoisting section 37 preferably includes a protective support bar 38, and a power operated winch 39 situated posterior of the support bar 38 and coupled thereto. Such a power operated winch 39 may further be electrically coupled to an existing power source 40 of the existing all-terrain vehicle 11. A single and unitary beam 41 preferably has a curvilinear shape situated subjacent to the power operated winch 39 and may extend distally away therefrom. Such a beam 41 preferably has first, second and third monolithically formed linear segments 42A, 42B, 42C offset from each other and traveling along mutually exclusive planes respectively, and a first pulley 43 may be conjoined to the third linear segment 42C and may extend horizontally away therefrom.

Referring to FIGS. 2 and 3, the second hoisting section 37 may further include a substantially U-shaped second fastener 44, and a flexible second cable 45 that has a first end 46 anchored to the power operated winch 39 and further has a second end 47 directly affixed, without the use of intervening elements, to the second fastener 44 respectively. The second hoisting section 37 may further include a second pulley 48 attached to an existing support surface 16 spaced from the existing all-terrain vehicle 11 and disposed above the first pulley 43.

The second cable 45 preferably travels along a first linear path 49 extending downwardly and distally away from the power operated winch 39. Such a first linear path 49 may terminate at the first pulley 43, and the second cable 45 may further travel along a second linear path 50 that extends upwardly and distally away from the first pulley 43. Such a second linear path 50 preferably terminates at the second pulley 48, and the second cable 45 may further travel along a third linear path 51 extending vertically downward from the second pulley 48 and terminating at the second fastener 44. The combination of such claimed elements provides an unpredictable and unexpected result which is not rendered obvious by one skilled in the art wherein a user may use the first hoisting section 20 to load and unload an animal from the existing all-terrain vehicle 11 while simultaneously using the second hoisting section 37 to suspend another animal being skinned.

In this manner, the user may avoid waiting for a hoisted animal to be skinned before loading or unloading additional animals, thus saving time. Referring to FIGS. 2 and 4, the support bar 38 of the second hoisting section 37 preferably includes a bracket 53 medially situated between laterally opposed ends 60 thereof such that the bracket 53 is aligned anterior to the power operated winch 39. A plurality of cylindrical guide rollers 54 may be pivotally anchored to the bracket 53 and oriented adjacent to the first linear travel path 49. Such rollers 54 are oppositely spaced left and right sides of the second cable 45 for prohibiting the second cable 45 from undesirably oscillating away from the first linear path 49 when the second animal 15 sways side-to-side.

The first and second hoisting sections 20, 37 may be independently and simultaneously operable such that the first and second animals 13, 15 are contemporaneously maintained at substantially stable positions respectively. The combination of such claimed elements provides an unpredictable and unexpected result which is not rendered obvious by one skilled in the art wherein a user may independently lower or raise the second animal 15 using the power operated winch 39 in order to remove meat or skin from different sections of the animal.

In use, a preferable method for easily loading and unloading a first animal 13 from an existing all-terrain vehicle 11 while skinning a second animal 15 supported by the existing all-terrain vehicle 11 may include the steps of providing and coupling a first hoisting section 20 to a rear section 12 of the existing all-terrain vehicle 11 and providing and coupling a second hoisting section 27 to a front section of the existing all-terrain vehicle 11. The method may also include the steps of independently and simultaneously loading and unloading a first animal 13 from the all-terrain vehicle 11 while suspending a second animal 15 at a desired height above a ground surface by independently and simultaneously operating the first and second hoisting sections 20, 27 and contemporaneously maintaining the first and second animals 13, 15 at substantially stable positions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A multi-animal hoisting system for use with an existing all-terrain vehicle such that a user is able to easily load and unload a first animal from the existing all-terrain vehicle while skinning a second animal supported by the existing all-terrain vehicle, said multi-animal hoisting system comprising:

a first hoisting section adapted to be coupled to a rear section of the existing all-terrain vehicle for loading and unloading a first animal from the all-terrain vehicle respectively; and a second hoisting section adapted to be coupled to a front section of the existing all-terrain vehicle for suspending a second animal at a desired height above a ground surface;

wherein said first and second hoisting sections are simultaneously operable such that the first and second animals are contemporaneously maintained at substantially stable positions respectively; and wherein said first hoisting section comprises:

a first sleeve oriented along a vertical axis and being statically maintained at a fixed spatial distance from said second hoisting section;

a first rectilinear shaft rotatably seated within said first sleeve and extending upwardly therefrom along the vertical axis;

a second sleeve statically coupled to a top end of said first shaft, said second sleeve being angularly offset from the vertical axis such that axially opposed ends of said second sleeve are disposed below and above said top end of said first shaft respectively;

a second rectilinear shaft removably interfitted within said second sleeve and extending parallel thereto; and a third rectilinear shaft directly mated to said second shaft and being angularly offset therefrom such that said third shaft is aligned with a horizontal axis registered orthogonal to the vertical axis.

2. The multi-animal hoisting system of claim 1, wherein said first hoisting section further comprises:

a manually operated winch anchored to said first shaft;

first and second pulleys anchored to said first and third shafts respectively;

a substantially U-shaped first fastener;

a flexible first cable having a first end anchored to said winch and further having a second end conjoined directly to said first fastener;

wherein said first cable travels along mutually exclusive first and second linear paths registered parallel to said first and second shafts respectively, said first cable further traveling along a third linear path extending downwardly from said second pulley and terminating at said fastener respectively.

3. The multi-animal hoisting system of claim 2, wherein said first cable and said first, second and third shafts are contemporaneously rotated about the vertical axis such that the first animal is swiveled towards the existing all-terrain vehicle.

4. The multi-animal hoisting system of claim 1, wherein said second hoisting section comprises:

a protective support bar;

a power operated winch situated posterior of said support bar and being coupled thereto, said power operated winch further being electrically coupled to an existing power source of the existing all-terrain vehicle;

a single and unitary beam having a curvilinear shape situated subjacent to said power operated winch and extending distally away therefrom, said beam having first, second and third monolithically formed linear segments offset from each other and traveling along mutually exclusive planes respectively;

a first pulley conjoined to said third linear segment and extending horizontally away therefrom;

a substantially U-shaped second fastener;

a flexible second cable having a first end anchor to said power operated winch and further having a second end directly affixed to said second fastener respectively; and a second pulley attached to an existing support surface spaced from the existing all-terrain vehicle and disposed above said first pulley.

5. The multi-animal hoisting system of claim 4, wherein said second cable travels along a first linear path extending downwardly and distally away from said power operated winch, said first linear path terminating at said first pulley, said second cable further traveling along a second linear path extend upwardly and distally away from said first pulley, said second linear path terminating at said second pulley, said second cable further traveling along a third linear path extending vertically downward from said second pulley and terminating at said second fastener.

6. The multi-animal hoisting system of claim 5, wherein said support bar comprises:

a bracket medially situated between laterally opposed ends thereof such that said bracket is aligned anterior to said power operated winch; and a plurality of cylindrical guide rollers pivotally anchored to said bracket and oriented adjacent to said first linear travel path;

wherein said rollers are oppositely spaced left and right sides of said second cable for prohibiting said second cable from undesirably oscillating away from said first linear path when the second animal sways side-to-side.

7. A multi-animal hoisting system for use with an existing all-terrain vehicle such that a user is able to easily load and unload a first animal from the existing all-terrain vehicle while skinning a second animal supported by the existing all-terrain vehicle, said multi-animal hoisting system comprising:

a first hoisting section adapted to be coupled to a rear section of the existing all-terrain vehicle for loading and unloading a first animal from the all-terrain vehicle respectively; and a second hoisting section adapted to be coupled to a front section of the existing all-terrain vehicle for suspending a second animal at a desired height above a ground surface;

wherein said first and second hoisting sections are independently and simultaneously operable such that the first and second animals are contemporaneously maintained at substantially stable positions respectively; and wherein said first hoisting section comprises:

a first sleeve oriented along a vertical axis and being statically maintained at a fixed spatial distance from said second hoisting section;

a first rectilinear shaft rotatably seated within said first sleeve and extending upwardly therefrom along the vertical axis;

a second sleeve statically coupled to a top end of said first shaft, said second sleeve being angularly offset from the vertical axis such that axially opposed ends of said second sleeve are disposed below and above said top end of said first shaft respectively;

a second rectilinear shaft removably interfitted within said second sleeve and extending parallel thereto; and a third rectilinear shaft directly mated to said second shaft and being angularly offset therefrom such that said third shaft is aligned with a horizontal axis registered orthogonal to the vertical axis.

8. The multi-animal hoisting system of claim 7, wherein said first hoisting section further comprises:

a manually operated winch anchored to said first shaft;

first and second pulleys anchored to said first and third shafts respectively;

a substantially U-shaped first fastener;

a flexible first cable having a first end anchored to said winch and further having a second end conjoined directly to said first fastener;

wherein said first cable travels along mutually exclusive first and second linear paths registered parallel to said first and second shafts respectively, said first cable further traveling along a third linear path extending downwardly from said second pulley and terminating at said fastener respectively.

9. The multi-animal hoisting system of claim 8, wherein said first cable and said first, second and third shafts are contemporaneously rotated about the vertical axis such that the first animal is swiveled towards the existing all-terrain vehicle.

10. The multi-animal hoisting system of claim 7, wherein said second hoisting section comprises:

a protective support bar;

a power operated winch situated posterior of said support bar and being coupled thereto, said power operated winch further being electrically coupled to an existing power source of the existing all-terrain vehicle;

a single and unitary beam having a curvilinear shape situated subjacent to said power operated winch and extending distally away therefrom, said beam having first, second and third monolithically formed linear segments offset from each other and traveling along mutually exclusive planes respectively;

a first pulley conjoined to said third linear segment and extending horizontally away therefrom;

a substantially U-shaped second fastener;

a flexible second cable having a first end anchor to said power operated winch and further having a second end directly affixed to said second fastener respectively; and a second pulley attached to an existing support surface spaced from the existing all-terrain vehicle and disposed above said first pulley.

11. The multi-animal hoisting system of claim 10, wherein said second cable travels along a first linear path extending downwardly and distally away from said power operated winch, said first linear path terminating at said first pulley, said second cable further traveling along a second linear path extend upwardly and distally away from said first pulley, said second linear path terminating at said second pulley, said second cable further traveling along a third linear path extending vertically downward from said second pulley and terminating at said second fastener.

12. The multi-animal hoisting system of claim 11, wherein said support bar comprises:

a bracket medially situated between laterally opposed ends thereof such that said bracket is aligned anterior to said power operated winch; and a plurality of cylindrical guide rollers pivotally anchored to said bracket and oriented adjacent to said first linear travel path;

wherein said rollers are oppositely spaced left and right sides of said second cable for prohibiting said second cable from undesirably oscillating away from said first linear path when the second animal sways side-to-side.

\* \* \* \* \*